United States Patent [19]

Miyachi et al.

[11] Patent Number: 5,511,461
[45] Date of Patent: Apr. 30, 1996

[54] ACTUATOR WITH SLIDE TABLE

[75] Inventors: Hiroshi Miyachi; Mitsutoshi Araki; Yoshiteru Ueno; Norihide Yamase, all of Ibaraki, Japan

[73] Assignee: SMC Kabushiki Kaisha, Tokyo, Japan

[21] Appl. No.: 422,161

[22] Filed: Apr. 14, 1995

[30] Foreign Application Priority Data

May 18, 1994 [JP] Japan ................... 6-103921

[51] Int. Cl.$^6$ .................................................. F01B 31/14
[52] U.S. Cl. ........................................ 92/13.5; 92/165 R
[58] Field of Search ............................ 92/13, 13.5, 13.7, 92/165 R

[56] References Cited

U.S. PATENT DOCUMENTS

| | | |
|---|---|---|
| 3,439,581 | 4/1969 | Wilkins . |
| 4,838,146 | 6/1989 | Stoll ............................................ 92/13.5 |
| 5,305,683 | 4/1994 | Gosdowski et al. ....................... 92/13.5 |
| 5,363,741 | 11/1994 | Takada et al. ............................. 92/13.5 |

FOREIGN PATENT DOCUMENTS

| | | |
|---|---|---|
| 0111565 | 6/1984 | European Pat. Off. . |
| 0134398 | 3/1985 | European Pat. Off. . |
| 0299285 | 1/1989 | European Pat. Off. . |
| 0603459 | 6/1994 | European Pat. Off. . |
| 3719627 | 12/1988 | Germany . |
| 1479726 | 5/1989 | U.S.S.R. ..................................... 92/13.7 |
| WO92/17321 | 10/1992 | WIPO . |

*Primary Examiner*—Thomas E. Denion
*Attorney, Agent, or Firm*—Oblon, Spivak, McClelland, Maier & Neustadt

[57] ABSTRACT

An air cylinder has a cylinder body, a slide table movable along a guide rail on the cylinder body, a stopper block mounted on the cylinder body, a pair of adjustment bolts mounted on the slide table and spaced from each other with the stopper block interposed therebetween, and a cover disposed on and extending along a side edge of the slide table in covering relation to the stopper block and the adjustment bolts.

2 Claims, 5 Drawing Sheets

ACTUATOR WITH SLIDE TABLE

BACKGROUND OF THE INVENTION

1. Field of the Invention

The present invention relates to an actuator which is combined with a slide table and operable for displacing the slide table along a guide rail.

2. Description of the Related Art

Actuators coupled with slide tables are sometimes used to convey workpieces from one position to another position.

One conventional actuator with a slide table is shown in FIG. 5 of the accompanying drawings.

As shown in FIG. 5, an actuator 1 basically comprises a cylinder body 2 substantially in the shape of an elongate rectangular parallelepiped, a slide table 3 displaceable axially along the cylinder body 2, a piston rod 4 coupled to a piston (not shown) which is movably disposed in a bore that is defined in one side of the cylinder body 2, an end block 5 supporting a distal end of the piston rod 4 and coupled to an end of the slide table 3, and a linear guide 6 coupled to an upper surface of the cylinder body 2 for guiding the slide table 3.

A pair of adjustment bolts 7a, 7b spaced a certain distance from each other is mounted on one side of the slide table 3 near the piston rod 4 for finely adjusting the displacement of the slide table 3. A stopper block 8 which is in the shape of an elongate rectangular parallelepiped is fixed to the upper surface of the cylinder body 2 for limiting the displacement of the slide table 3 by engaging the adjustment bolts 7a, 7b.

When air is supplied under pressure into the cylinder body 2 through a port (not shown) defined in one side of the cylinder body 2, the piston is pushed in one direction to cause the piston rod 4 to displace the slide table 3 in the direction indicated by the arrow X. When air is supplied under pressure into the cylinder body 2 through another port (not shown) defined in one side of the cylinder body 2, the piston is pushed in the opposite direction to cause the piston rod 4 to displace the slide table 3 in the direction indicated by the arrow Y. In this manner, the slide table 3 can be linearly displaced in the direction X or Y along the linear guide 6.

The adjustment bolts 7a, 7b and the stopper block 8 are exposed on the upper side of the actuator 1. Therefore, foreign matter tends to be put between the adjustment bolts 7a, 7b and the stopper block 8. If some foreign matter is placed between one of the adjustment bolts 7a, 7b and the stopper block 8, the slide table 3 may not move properly the full reciprocating stroke when it approaches a terminal end of the range of displacement thereof.

SUMMARY OF THE INVENTION

It is an object of the present invention to provide an actuator which is capable of reciprocally moving a slide table over an exact reciprocating stroke thereof for accurately positioning a workpiece that is carried on the slide table.

Another object of the present invention is to provide an actuator having a cover which is disposed over members for limiting the displacement of a slide table that can be reciprocally moved by the actuator.

Still another object of the present invention is to provide an actuator combined with a slide table, the actuator being of a simple and compact structure and having a sightly appearance.

According to the present invention, there is provided an actuator comprising a cylinder body having a pair of fluid ports defined therein, a piston movably disposed in the cylinder body, a piston rod coupled to the piston for displacement in an axial direction of the cylinder body in response to movement of the piston in the cylinder body, a guide rail extending from one end of the cylinder body to an opposite end thereof in the axial direction of the cylinder body, a slide table disposed for displacement along the guide rail, an end block coupled to an end of the slide table and supporting a distal end of the piston rod, a set of members for limiting a range of relative displacement of the cylinder body and the slide table, and a cover disposed on and extending along a side edge of the slide table in covering relation to the members.

The members include a stopper block mounted on one of the cylinder body and the slide table and a pair of adjustment bolts mounted on the other of the cylinder body and the slide table and spaced from each other with the stopper block interposed therebetween.

Preferably, the slide table and the cover are integral with each other.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
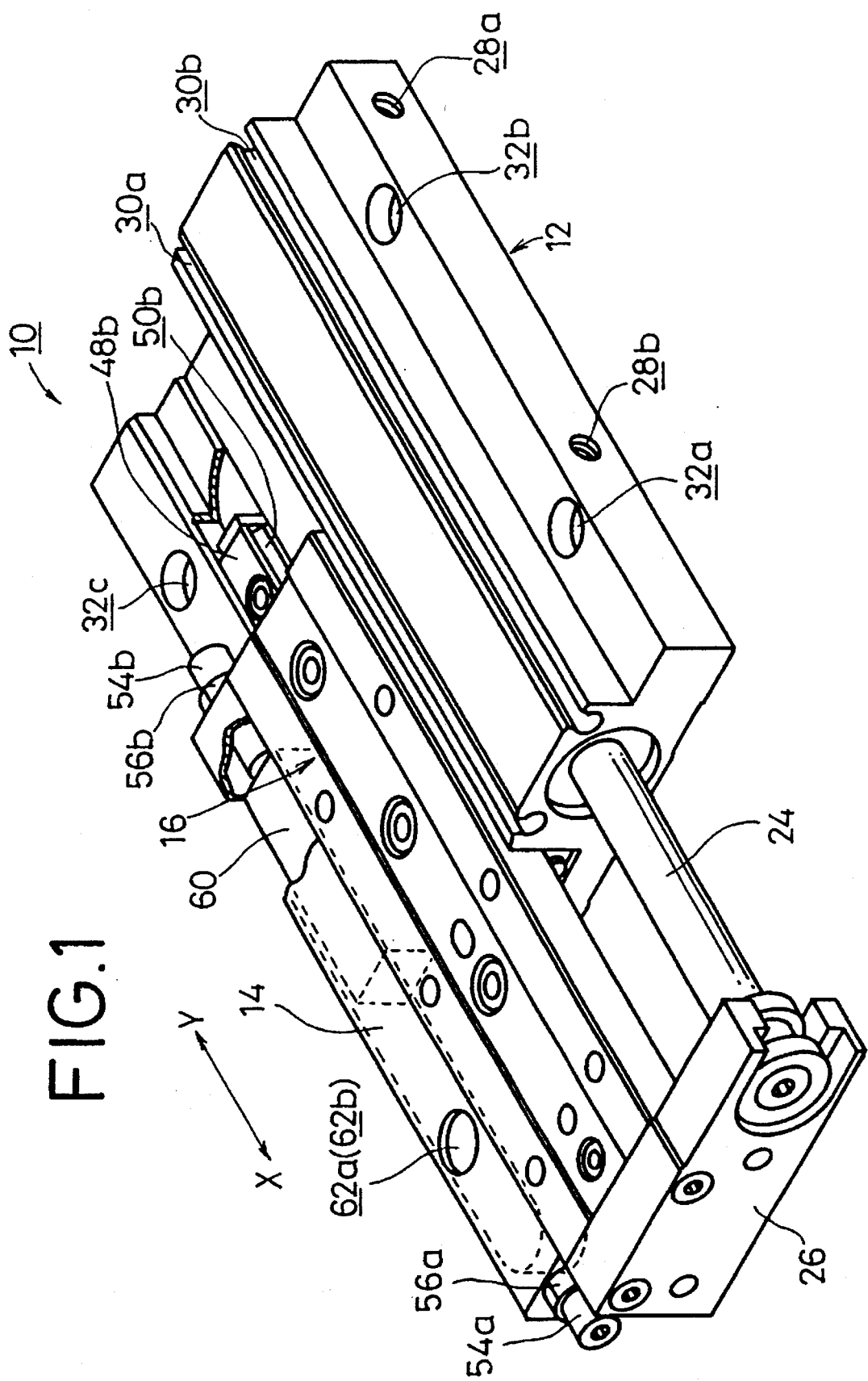
FIG. 1 is a perspective view, partly broken away, of an air cylinder with a slide table according to the present invention.

As shown in FIG. 1, an air cylinder 10 according to the present invention basically comprises an elongate rectangular cylinder body 12, a slide table 16 having a cover 14 and linearly reciprocally movable axially along the cylinder body 12, and a guide rail 20 (see FIGS. 2 and 4) integrally fastened to a lower surface of the slide table 16 by screws 18.

Figure 2:
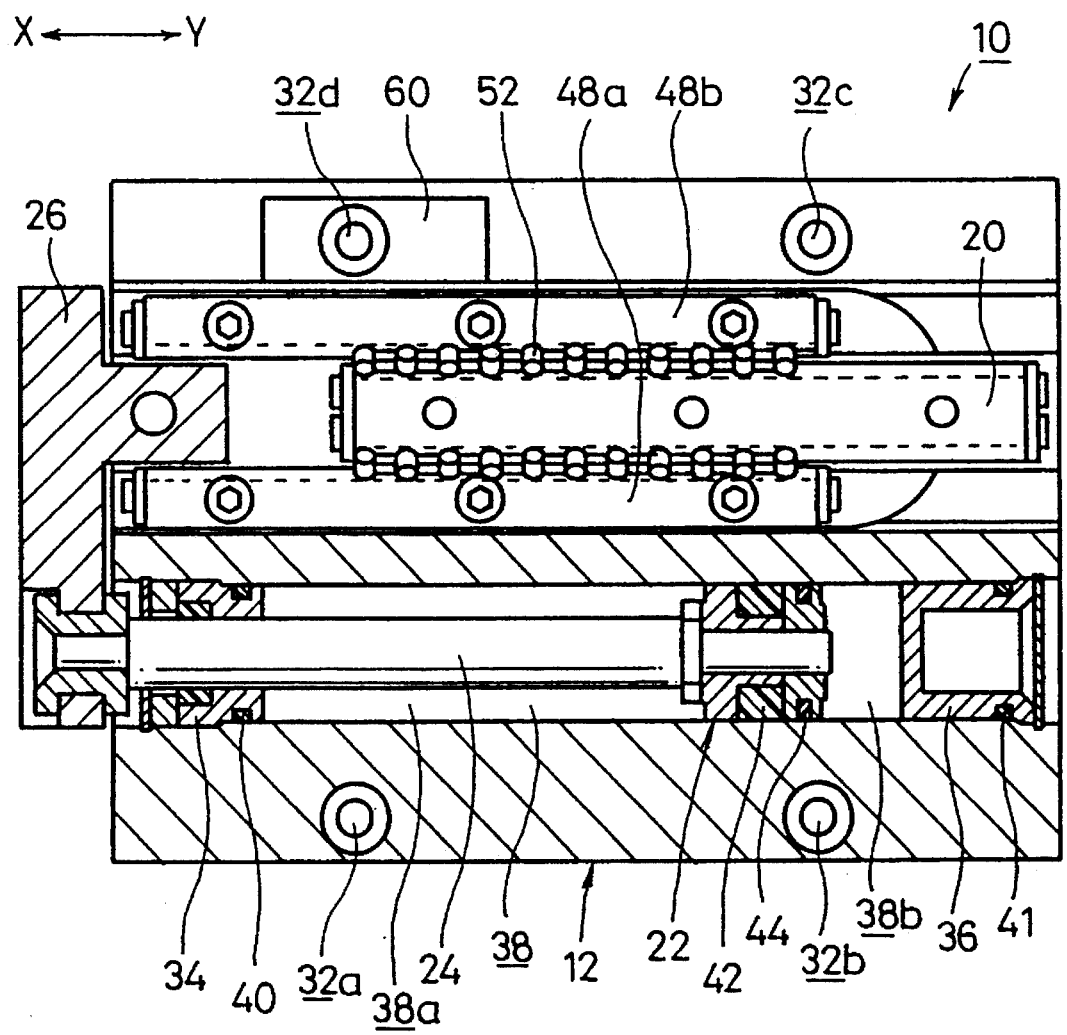
FIG. 2 is a plan view, partly in horizontal cross section, of the actuator shown in FIG. 1.

As shown in FIG. 2, the cylinder body 12 has an elongate cylinder chamber 38 defined in a side region thereof off the central axis of the cylinder body 12. The cylinder chamber 38 has its opposite open ends closed off by respective closures 34, 36 over which respective ring-shaped seals 40, 41 are fitted. A piston 22 is movably disposed in the cylinder chamber 38 for displacement selectively in the directions indicated by the arrows X, Y along the cylinder body 12. A piston rod 24 has an end connected coaxially to the piston 22 and can project from the cylinder chamber 38 through the closure 34. The end of the piston rod 24 which projects from the cylinder chamber 38 is connected to an end block 16 which is coupled to an end of the slide table 26.

The cylinder body 12 has a pair of compressed-air ports 28a, 28b (see FIG. 1) defined in one side thereof and communicating with the cylinder chamber 38, the compressed-air ports 28a, 28b being spaced from each other in the longitudinal direction of the cylinder body 12. The cylinder body 12 also has a pair of transversely spaced sensor attachment grooves 30a, 30b defined in an upper surface thereof and extending along the cylinder chamber 38. Each of the sensor attachment grooves 30a, 30b is of a partly cylindrical shape and has a slot opening outwardly of the cylinder body 12. The cylinder body 12 further has a plurality of attachment holes 32a–32d defined in outer edges thereof for receiving fasteners (not shown) therein to install the cylinder body 12 on another apparatus.

As shown in FIG. 2, the piston 22 has annular grooves defined in an outer circumferential surface thereof and accommodating a ring-shaped magnet 42 and a seal ring 44 respectively therein. The position of the piston 22 in the cylinder chamber 38 is detected when a magnetic field produced by the ring-shaped magnet 42 is detected by sensors mounted in the grooves 30a, 30b.

The cylinder chamber 38 is divided by the piston 22 into subchambers 38a, 38b positioned one on each side of the piston 22. The compressed-air ports 28a, 28b are held in communication with the subchambers 38b, 38a, respectively. Air under pressure can be introduced into the subchambers 38b, 38a through the respective compressed-air ports 28a, 28b.

The guide rail 20 extends a given length along the central axis of the slide table 16, and has a pair of guide grooves 46a, 46b (see FIG. 4) of substantially V-shaped cross section which are defined respectively in transversely opposite side surfaces of the guide rail 20. A pair of linear guides 48a, 48b is fixedly mounted on a stepped surface of the cylinder body 12 which lies laterally of the cylinder chamber 38. The linear guides 48a, 48b are positioned adjacent to the respective opposite side surfaces of the guide rail 20. The linear guides 48a, 48b have respective guide grooves 50a, 50b of substantially V-shaped cross section which are defined in side surfaces thereof which face the respective opposite side surfaces of guide rail 20. A plurality of substantially cylindrical rollers 52 engage rollingly in the guide grooves 46a, 46b, 50a, 50b. Therefore, the guide rail 20 and hence the slide table 16 can smoothly be displaced in the direction X or Y (see FIG. 2) along the linear guides 48a, 48b as the rollers 52 roll in and along the guide grooves 46a, 46b, 50a, 50b.

Figure 3:
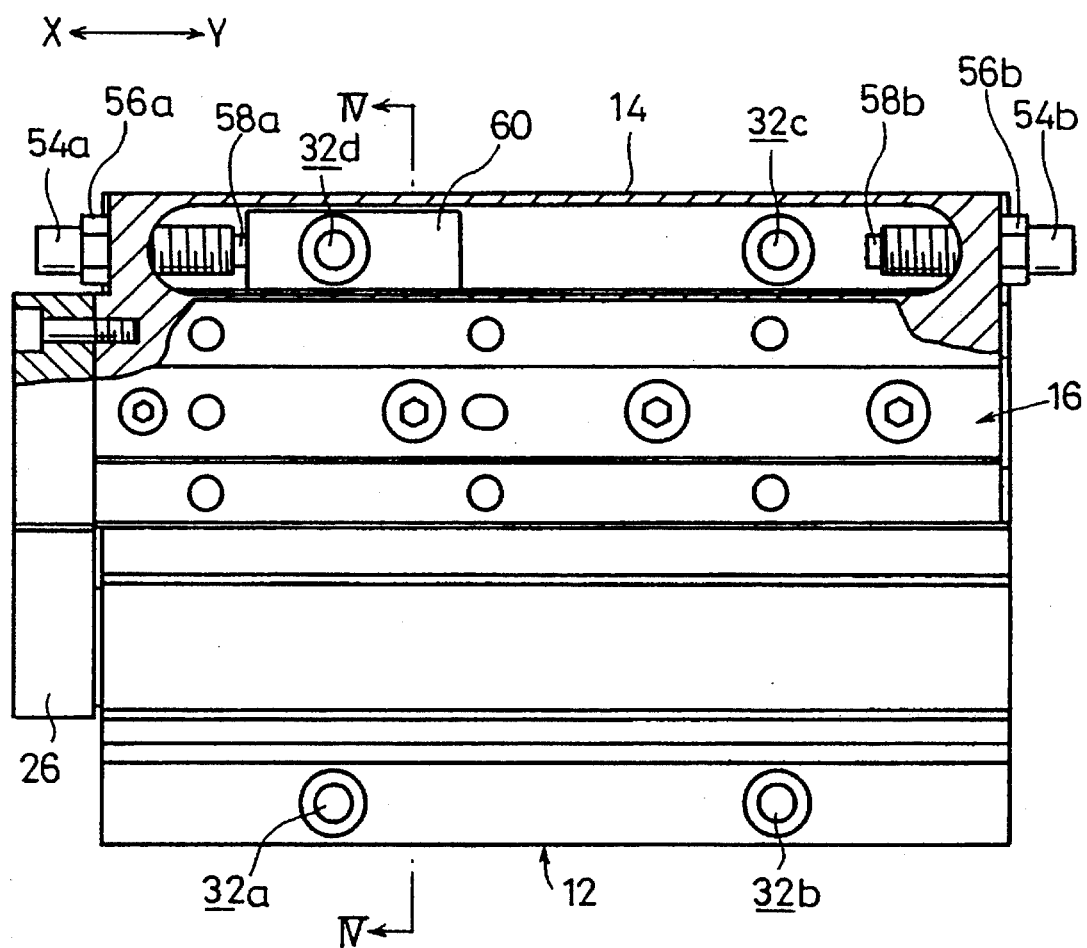
FIG. 3 is a plan view, partly in horizontal cross section, of the actuator shown in FIG. 1.
Figure 4:
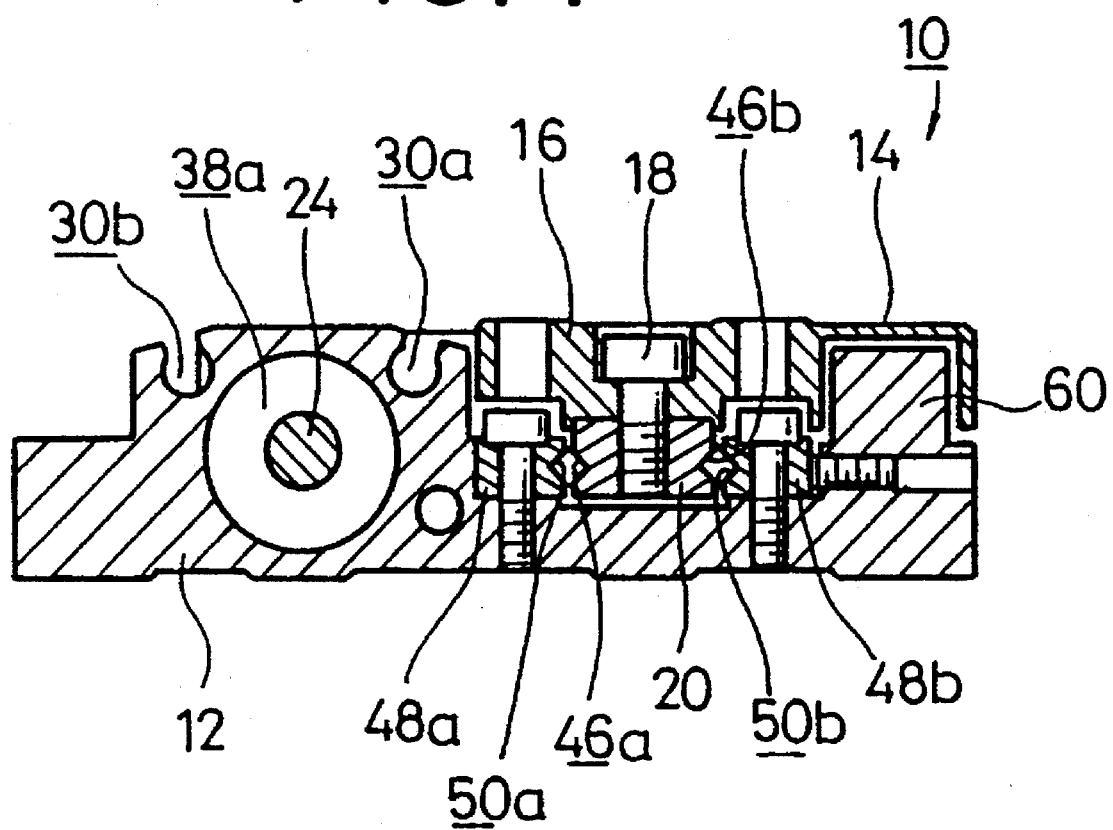
FIG. 4 is a cross-sectional view taken along line IV—IV of FIG. 3.
Figure 5:
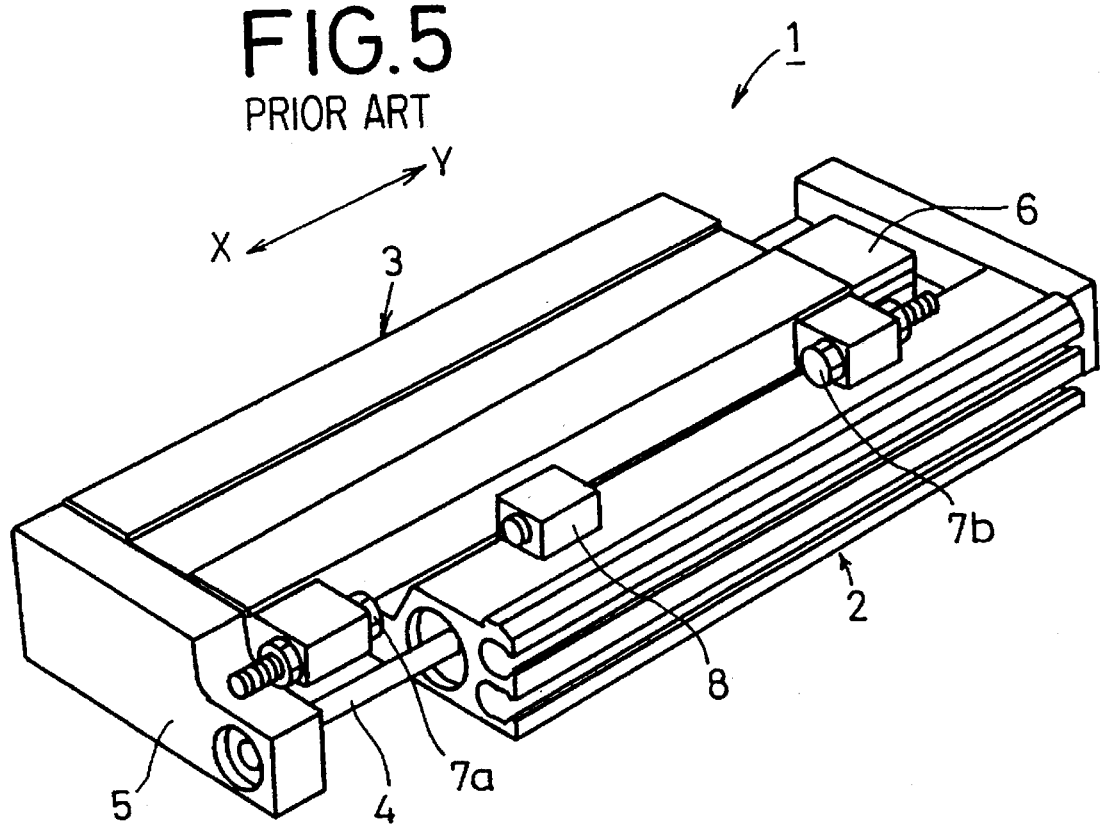
FIG. 5 is a perspective view of a conventional actuator with a slide table.

As shown in FIGS. 1, 3, and 4, the cover 14 which is of an elongate shape of L-shaped cross section is integrally joined to and extends along a transverse side edge of the slide table 16 which is remote from the piston rod 24. As shown in FIGS. 1 and 3, two adjustment bolts 54a, 54b are mounted respectively in longitudinally opposite ends of the cover 14 for finely adjusting the displacement of the slide table 16. Specifically, the adjustment bolts 54a, 54b are threaded through respective nuts 56a, 56b and the longitudinally opposite ends of the cover 14 longitudinally into the cover 14. The distance by which the adjustment bolts 54a, 54b are threaded into the cover 14 can be adjusted by turning the adjustment bolts 54a, 54b.

The adjustment bolts 54a, 54b have respective heads 58a, 58b which are positioned within the cover 14. When the slide table 16 is displaced in one direction, one of the heads 58a, 58b is brought into contact with a stopper block 60 substantially in the shape of a rectangular parallelepiped that is fixedly mounted on the cylinder body 12 at one side thereof remote from the cylinder chamber 38. When one of the heads 58a, 58b is thus contacted by the stopper block 60, the displacement of the slide table 16 in that direction is stopped or limited. Therefore, the heads 58a, 58b limit the range of displacement of the slide table 16 to the distance between the heads 58a, 58b. Portions of the adjustment bolts 54a, 54b which include the heads 58a, 58b and the stopper block 60 are covered with the cover 14 and hence concealed from exposure.

The cover 14 has circular holes 62a, 62b defined in an upper panel thereof. The circular holes 62a, 62b can be brought into registration with the attachment holes 32c, 32d so that screws (not shown) can easily be inserted through the circular holes 62a, 62b into the attachment holes 32c, 32d when the cylinder body 12 is to be fastened to another apparatus.

While the slide table 16 and the cover 14 are shown as being integrally joined to each other, they may be separate from each other. The cross-sectional shape of the cover 14 is not limited to a substantial L shape, but may be any of various shapes such as a curved shape insofar as it can cover the stopper block 60 and portions of the adjustment bolts 54a, 54b.

Operation and advantages of the air cylinder 10 of the above structure will be described below.

When air is supplied under pressure from the compressed-air port 28a into the subchamber 38b, the piston 22 is displaced by the supplied air in the direction X. When the piston 22 is thus displaced, the slide table 16 is also displaced in unison with the piston 22 smoothly along the linear guides 48a, 48b by the piston rod 24 and the end block 26.

The slide table 16 can also be displaced in the direction Y by the piston 22 when air is supplied under pressure from the compressed-air port 28b into the subchamber 38a.

When the slide table 16 reaches an end of the range or stroke of displacement thereof in the direction X or Y, one of the adjustment bolts 54a, 54b comes into contact with the stopper block 60. Since portions of the adjustment bolts 54a, 54b which include the heads 58a, 58b and the stopper block 60 are covered with the cover 14 integral with the slide table 16, they are not exposed and hence are protected from entry of foreign matter such as dust particles between the heads 58a, 58b and the stopper block 60. Consequently, the slide table 16 can reliably move back and forth fully over its stroke for reliably and accurately positioning a workpiece carried on the slide table 16. The air cylinder 10 with the slide table 16 can operate highly reliably and safely.

Although a certain preferred embodiment of the present invention has been shown and described in detail, it should be understood that various changes and modifications may be made therein without departing from the scope of the appended claims.

What is claimed is:

1. An actuator comprising:

a cylinder body having a pair of fluid ports defined therein;

a piston movably disposed in said cylinder body;

a piston rod coupled to said piston for displacement in an axial direction of said cylinder body in response to movement of said piston in said cylinder body;

a guide rail disposed laterally on one side of said cylinder body and extending from one end of said cylinder body to an opposite end thereof in the axial direction of said cylinder body;

a slide table disposed for displacement along said guide rail;

an end block coupled to an end of said slide table and supporting a distal end of said piston rod;

a set of members for limiting a range of relative displacement of said cylinder body and said slide table; and a cover disposed on and extending along a side edge of said slide table in covering relation to said members, said cover being integrally attached to said slide table and movable in unison with said slide table when said slide table is displaced along said guide rail.

2. An actuator according to claim 1, wherein said members include a stopper block mounted on one of said cylinder body and said slide table and a pair of adjustment bolts mounted on the other of said cylinder body and said slide table and spaced from each other with said stopper block interposed therebetween.

* * * * *